R. J. SHAW.
LUBRICATING APPARATUS.
APPLICATION FILED SEPT. 5, 1916.

1,208,672.

Patented Dec. 12, 1916.
2 SHEETS—SHEET 1.

Inventor
Robert J. Shaw
Lancaster
His Attorneys

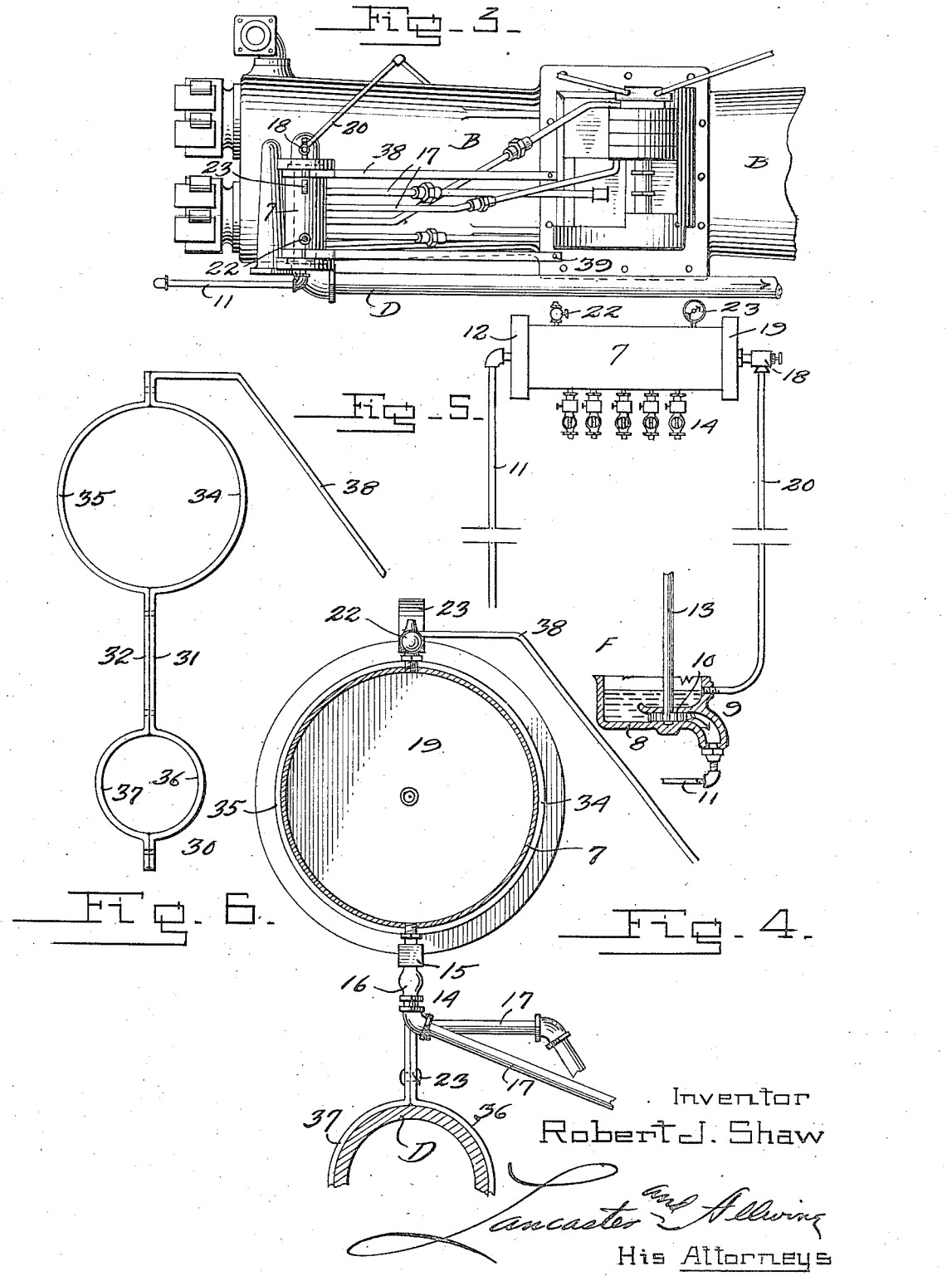

UNITED STATES PATENT OFFICE.

ROBERT J. SHAW, OF BEAUMONT, TEXAS.

LUBRICATING APPARATUS.

1,208,672.	Specification of Letters Patent.	Patented Dec. 12, 1916.

Application filed September 5, 1916.   Serial No. 118,399.

*To all whom it may concern:*

Be it known that I, ROBERT J. SHAW, a citizen of the United States, and a resident of Beaumont, in the county of Jefferson and State of Texas, have invented a certain new and useful Improvement in Lubricating Apparatus, of which the following is a specification.

My present invention relates to lubricating apparatus for internal combustion engines, whereby the lubricant or oil is forced, as by a pump, to a distributing tank containing oil under predetermined pressure, and from said tank permitted to drop by gravity or flow under pressure, as desired, to the elements of the engine to be lubricated.

The principal objects of my invention are to provide lubricating apparatus which enables the operator to control the quantity of oil delivered to individual bearings or other elements of the machine, thereby avoiding waste of oil and energy in circulating the same, and preventing an excess of oil at portions, such as pistons, where it is apt to foul spark plugs, igniters and the like; and, to provide lubricating apparatus for internal combustion engines which includes tanks for the oil so arranged with respect to portions of the engine as to augment the flow of oil, especially in cold weather, by the heat rising or conducted from heated portions of the engine to the tank and outlet.

Figure 1:
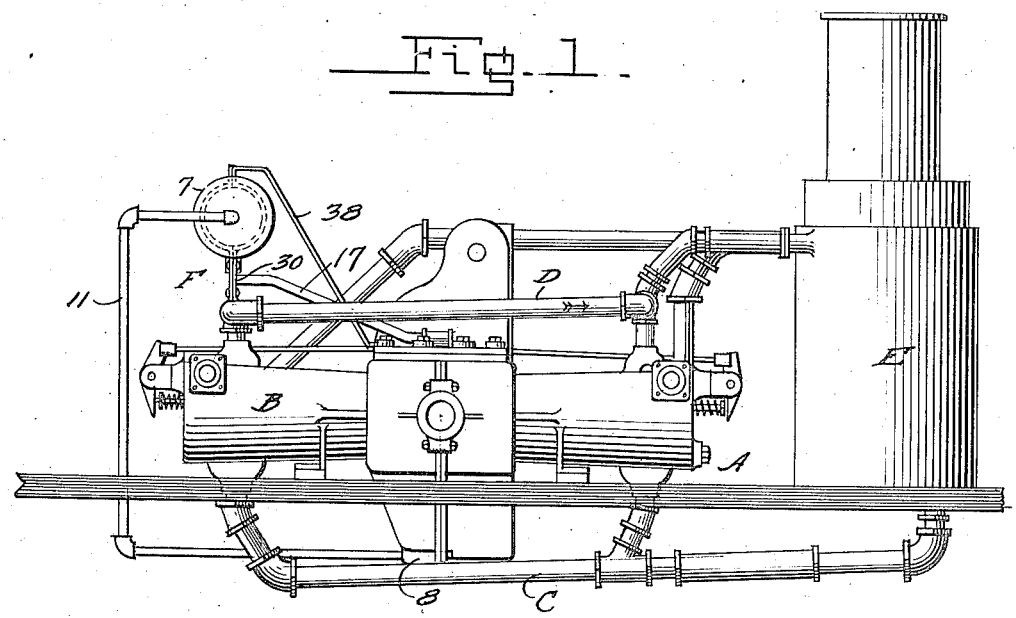
Figure 2:
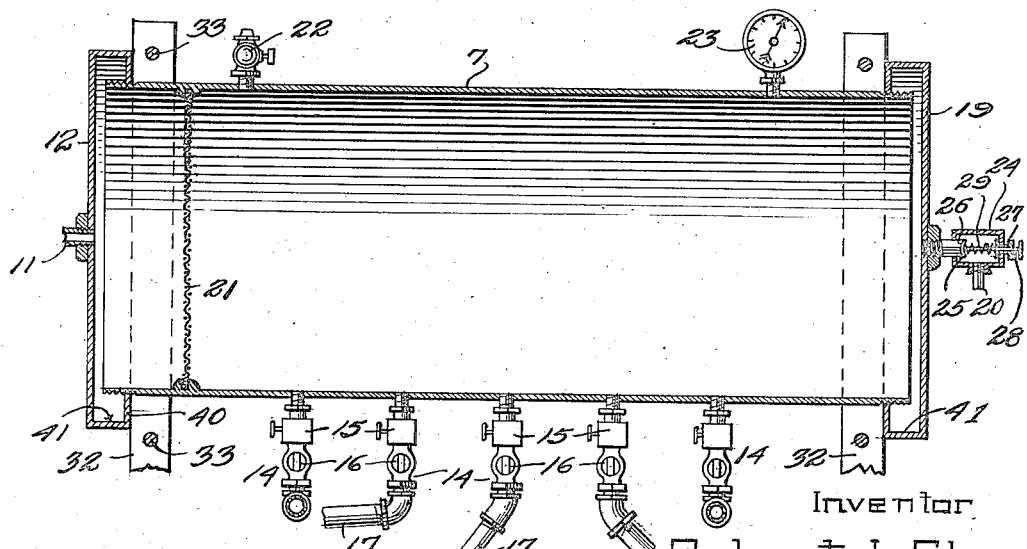

Other objects of my invention will appear in the following detailed description, taken in connection with the accompanying drawings, forming a part of this specification, and in which drawings:

Figure 1 is a side elevation of an internal combustion engine equipped with lubricating apparatus embodying my invention. Fig. 2 is an enlarged central vertical sectional view through a supply tank for the oil used as a lubricant. Fig. 3 is a fragmentary top plan view of the engine and apparatus as shown in Fig. 1. Fig. 4 is an enlarged vertical transverse sectional view through the tank and a portion of the engine, and showing other elements of the apparatus in elevation. Fig. 5 is a diagrammatic view of the apparatus. Fig. 6 is an elevation of means for supporting the supply tank of the apparatus from a portion of the engine.

In the drawings, where similar characters refer to similar parts throughout the several views, A designates a machine, such as an internal combustion engine, including a jacketing B for water or a cooling fluid, and pipes C and D of a thermo-siphon system in communication with said jacketing, the pipe C carrying the heated fluid to a radiator E; and, F, lubricating apparatus embodying my invention.

The apparatus F comprises a supply tank 7 to contain oil or other lubricant under pressure; an oil sump 8 below the tank 7, and in the example shown at the lowermost portion of the engine case; mechanism 9 for elevating oil from the oil sump 8 and introducing the same into tank 7 under pressure, in the example shown said mechanism comprising a pump 10 deriving its source of supply from the oil sump 8; and, piping 11 leading from the outlet of pump 10 to one head 12 of tank 7, the pump 10 being operated in any suitable manner, preferably by the engine A as through shaft 13; valve-controlled outlets 14 extending from below the tank 7 and open to the bottom of the interior thereof, in the example shown, these outlets each including a valve 15, a sight feed device 16 and a pipe 17 leading from said device 16 to a bearing or elements of the machine A to be lubricated; a regulable device 18 permitting oil under excess pressure to find egress from the tank 7, said device being in communication with the tank 7 at its other head 19; and, a conductor 20 for the oil from the egress of device 18 to the oil sump 8. If desired, a filtering device 21, such as a copper screen may be disposed intermediate the inlet of tank 7 and the outlets 14. An air outlet 22 may be provided at the upper portion of the tank 7, as well as a pressure gage 23 of any suitable type.

The valves 15 of outlet 14 may be of any suitable type which permit a quantity of oil to flow from the tank or to restrict the outlet so that a film of oil finds its way through the valve collecting in drops which are visible as they pass through the sight-feed devices 16. By manipulating the valve 15, the operator may provide for a flow of oil from the tank 7, where a large quantity of oil is required at bearings or other elements of the machine. If merely a small quantity of oil is required the valve may be manipulated so that such oil is supplied drop by drop and easily gaged as so many drops per minute.

As to the device 18, it may be of any suitable type, but in the example shown comprises a casing 24 in which is disposed a valve 25 and valve seat 26; a sleeve 27 extending through casing 24 and in screw-threaded engagement therewith, said sleeve receiving a valve stem 28; and, an expansion spring 29 interposed between the valve 25 and sleeve 27 which normally seats the valve 25. By rotating the sleeve 27 the device may be regulated so as to permit egress of oil when a certain pressure has been attained in the tank 7, due to operation of the pump 10.

It is preferred to dispose the tank 7 above the horizontally arranged conduit D for heated fluid, of the engine A as by means designated generally by 30. This means may comprise co-acting clamp members 31 and 32 joined together, as by rivets 33, the members 31 and 32 having complemental arcuate portions 34 and 35, respectively, to embrace the tank 7 and complemental arcuate portions 36 and 37, respectively, to embrace the pipe or conduit D. The clamp member 31 may also be provided with an extension 38 from its upper portion adapted to be secured to the engine casing as at 39. It is preferred to dispose a pair of co-acting clamp members' adjacent each end of the tank as is clearly shown in Fig. 3 of the drawing. The clamp members are preferably made of metal which conducts the heat from the conduit D to the tank 7, and any heat which rises from said conduit will augment the flow of oil through the valve 15 and sight-feed devices 16 of outlets 14.

With reference to the heads 12 and 19 of the tank 7, they are preferably provided with flanges 40 in screw-threaded engagement with the ends of the main body portion of the tank and formed to provided an annular sediment-collecting groove 41 at the interior of each head intermediate the face of the head and that portion of the flange 40 engaging the main body portion of the tank. Thus, any sediment which is carried from the oil sump 8 through the pipe 11 to the tank 7 will drop by gravity into the groove 41. The sediment may be easily removed by detaching the head from the main body portion of the tank, and if desired, the tank may be inclined to the horizontal so that sediment will collect in one or the other of the grooves 41. Where the lubricating apparatus is used on vehicles, such as tractors, passage of the vehicle over uneven ground will vibrate the tank 7 causing the sediment to collect, as hereinbefore described.

The operation of the apparatus is as follows: Upon setting the pump 10 into motion oil under pressure is delivered from the oil sump 8 to the tank 7. Until the tank is substantially filled with oil, the operator may open valve 22 and release any air which may have accumulated in the tank or system. Upon regulating the valves 15 of outlets 14 so that the desired quantity of oil will be delivered to the bearings or other elements of the machine A, the apparatus will be in operation. Should there be an excess pressure of oil within the tank 7, the device 18 will permit a quantity to flow therefrom to the oil sump 8 where it will accumulate, to be redelivered to the tank 7.

Changes in details may be made without departing from the spirit or scope of my invention; but,

I claim:

1. Lubricating apparatus comprising in combination, a tank to contain oil under pressure, an oil sump below said tank, mechanism for elevating oil from said sump and introducing the same into said tank under pressure, valve-controlled outlets extending from below said tank and open to the bottom of the interior thereof, a regulable device permitting oil under excess pressure to find egress from said tank, and a conductor for the oil from the egress of said device to said oil sump.

2. Lubricating apparatus comprising in combination, a tank to contain oil under pressure, an oil sump below said tank, a pump in said oil sump for elevating oil therefrom and introducing the same into said tank under pressure, valve-controlled outlets extending from below said tank and open to the bottom of the interior thereof, a regulable device permitting oil under excess pressure to find egress from said tank, and a conductor for the oil from the egress of said device to said oil sump.

3. Lubricating apparatus comprising in combination, a tank to contain oil under pressure, an oil sump below said tank, mechanism for elevating oil from said sump and introducing the same into said tank under pressure, valve-controlled outlets extending from below said tank and a conductor for oil open to said tank above its bottom for egress of oil therefrom, said conductor in communication with said oil sump.

4. Lubricating apparatus comprising in combination, a tank to contain oil under pressure, an oil sump below said tank, mechanism for elevating oil from said sump and introducing the same into said tank under pressure, outlets extending from below said tank and open to the bottom of the interior thereof, said outlets each embodying manually controlled devices for permitting oil to drop from said tank by gravity or flow therefrom due to internal pressure, a regulable device permitting oil under excess pressure to find egress from said tank, and a conductor for the oil from the egress of said device to said oil sump.

5. Lubricating apparatus comprising in combination, a tank to contain oil under pressure, an oil sump below said tank, mechanism for elevating oil from said sump and introducing the same into said tank under pressure, valve-controlled outlets extending from below said tank and open to the bottom of the interior thereof, a regulable device permitting oil under excess pressure to find egress from said tank, a conductor for the oil from the egress of said device to said oil sump, and a filtering device intermediate the ingress of said tank and said outlets.

6. Lubricating apparatus comprising in combination, a tank to contain oil under pressure, an oil sump below said tank, mechanism for elevating oil from said sump and introducing the same into said tank under pressure, valve-controlled outlets extending from below said tank and open to the bottom of the interior thereof, a regulable device permitting oil under excess pressure to find egress from said tank, a conductor for the oil from the egress of said device to said oil sump, and a filtering device intermediate the ingress of said tank and said outlets, and regulable device.

7. In lubricating apparatus, the combination of a horizontally arranged cylindrical shell, a head for each end of said shell, each head including an annular flange in screw-threaded engagement with said shell and formed to provide an annular sediment-collecting groove at its interior intermediate the face of said head and the engagement of said flange with said shell, and means for introducing oil into said cylinder at the face of one of said heads.

8. In lubricating apparatus, the combination of a horizontally arranged shell, a removable head at one end of said shell, said head including an annular flange in engagement with said shell and formed to provide an annular sediment-collecting groove at its interior intermediate the face of the head and that portion of said flange engaging said shell, and means for introducing oil into said cylinder at the face of said head.

9. In lubricating apparatus, the combination with a machine including a horizontally arranged conduit for a heated fluid, of a tank to contain oil under pressure, means for supporting said tank from and above said conduit, said means of material conducting heat, an oil sump below said tank, mechanism for elevating oil from said sump and introducing the same into said tank under pressure, valve-controlled outlets extending from below said tank and open to the bottom of the interior thereof and leading to various elements of said machine to be lubricated, a regulable device permitting oil under excess pressure to find egress from said tank, and a conductor for the oil from the ingress of said device to said oil sump.

ROBERT J. SHAW.